Harry L. Burgess
INVENTOR.

BY Bertram N. Mann
ATTORNEY

United States Patent Office 3,319,981
Patented May 16, 1967

3,319,981
CONSTANT TENSION SUPPORT FOR SUBMERGED CONDUCTOR PIPES
Harry L. Burgess, 1506 Latexo Drive, Houston, Tex. 77018
Filed Mar. 15, 1965, Ser. No. 439,694
10 Claims. (Cl. 285—302)

ABSTRACT OF THE DISCLOSURE

Pneumatic motors connected to the slidably telescoped intermediate parts of a conductor pipe extending from a drill vessel to the water bottom to maintain the conductor pipe under substantially uniform tension irrespective of wind, wave, and tide action on the vessel.

This invention relates to conductors for connecting a submerged well to a floating vessel thereabove, for instance, a drilling barge which is subjected to wave and/or tide action.

Well drilling and other operations performed in relatively deep, unprotected waters frequently are performed from a floating vessel through a large pipe, called a conductor, which extends from the vessel to the wellhead on the water bottom. Since the conductor pipe is supported by the vessel, some means, such as one or more slip joints, is ordinarily provided to accommodate vertical displacement of the vessel due to wave and tide action. Such slip joints have not been fully satisfactory due to the tendency to burst their seals in case of rapid rising of the vessel and the pipe section connected thereto, even though a pressure regulator may be connected to the slip joint to provide a resilient fluid charge therein. Furthermore, tide action tends to reduce the amount of play in the slip joint or joints which is available to accommodate rocking or lifting of the work vessel due to wave action. Thus, abnormal or even destructive stresses may be applied to the conductor due to the exhaustion of play in a slip joint.

Accordingly, an object of the present invention is to provide a novel slip joint for a conductor or other pipe connecting an underwater location and a floating vessel subject to wave and/or tide action.

Another object is to provide a conductor or the like which incorporates a novel slip joint as well as novel means resliently supporting the lower pipe section from the upper pipe section.

Still another object is to provide a conductor or the like having slip joint structure and means for maintaining substantially constant tension on the conductor irrespective of rising and falling of the upper pipe section or sections due, for instance, to wave or tide action or both.

Still another object is to provide a conductor or the like incorporating novel manual or automatic means to compensate for rising and falling of the vessel to which the conductor extends.

In the accompanying drawings which illustrate the invention.

FIG. 3 is a wiring diagram illustrating automatic and manual controls for the wave and tide action compensating means.

According to the present invention, the conductor is provided with telescoped sections sealingly engaged and forming a slip joint. Secured to the upper pipe section are a plurality of pneumatic cylinders provided with vertically-moving plungers. Secured to the lower pipe sections substantially below the upper cylinders is a second group of pneumatic cylinders also provided with working plungers. The upper cylinders are provided with a substantially uniform pneumatic charge beneath the plungers therein for resiliently supporting the lower pipe sections from the upper section which is secured to the work vessel. The upper plungers are connected by links to the plungers in the lower cylinders and the lower cylinders are connected on opposite sides of the plungers therein to a source of pneumatic pressure. The supply of working fluid to the lower cylinders is controlled either manually or automatically so as to lift or lower both the upper and lower plungers as the pipe sections move together or apart so as to maintain the upper plungers substantially centered in their respective cylinders.

Figure 1:
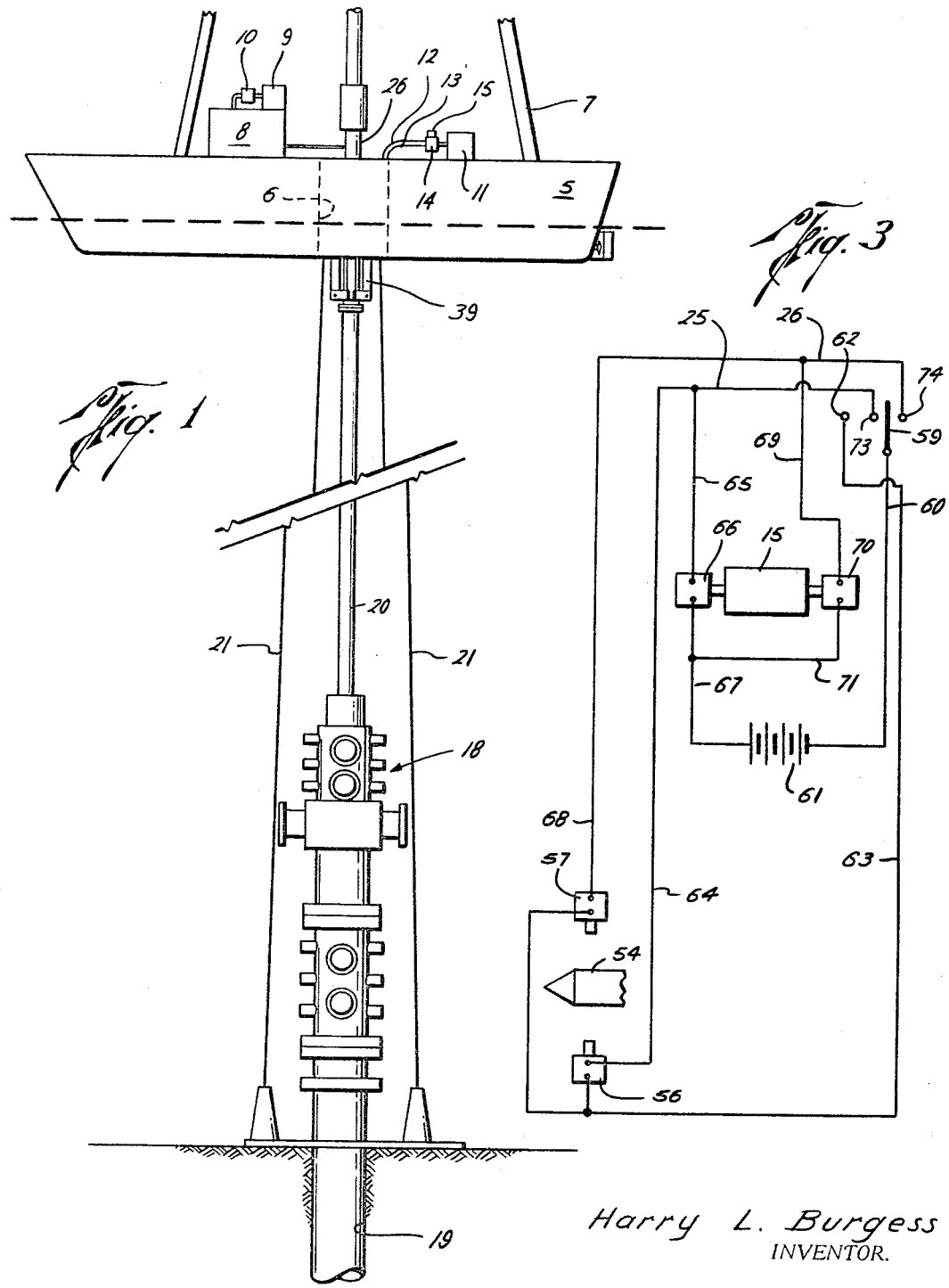
FIG. 1 is a generally schematic elevation illustrating a conductor pipe extending from the submerged well to a floating work vessel and incorporating the present invention.

Referring to the drawings, FIG. 1 shows a floating drilling barge 5 on which is mounted a drilling rig and equipment. The barge has a central well 6 above which there is mounted a derrick 7 and the usual rotary drilling machinery. A first accumulator tank 8 is mounted on the vessel in association with a pneumatic compressor 9 and compressor regulator 10. A second accumulator unit 11 is also mounted on the vessel, and pipelines 12 and 13 leading therefrom are controlled by a four-way valve 14 actuated by a suitable solenoid or other motor device 15.

Extending from the vessel to the submerged wellhead instrumentalities 18 mounted on submerged well 19 is a conductor 20 of relatively large diameter through which drilling and other operations are performed. Also shown are guide lines 21 for use in directing equipment to and from the vessel to the well.

Figure 2:
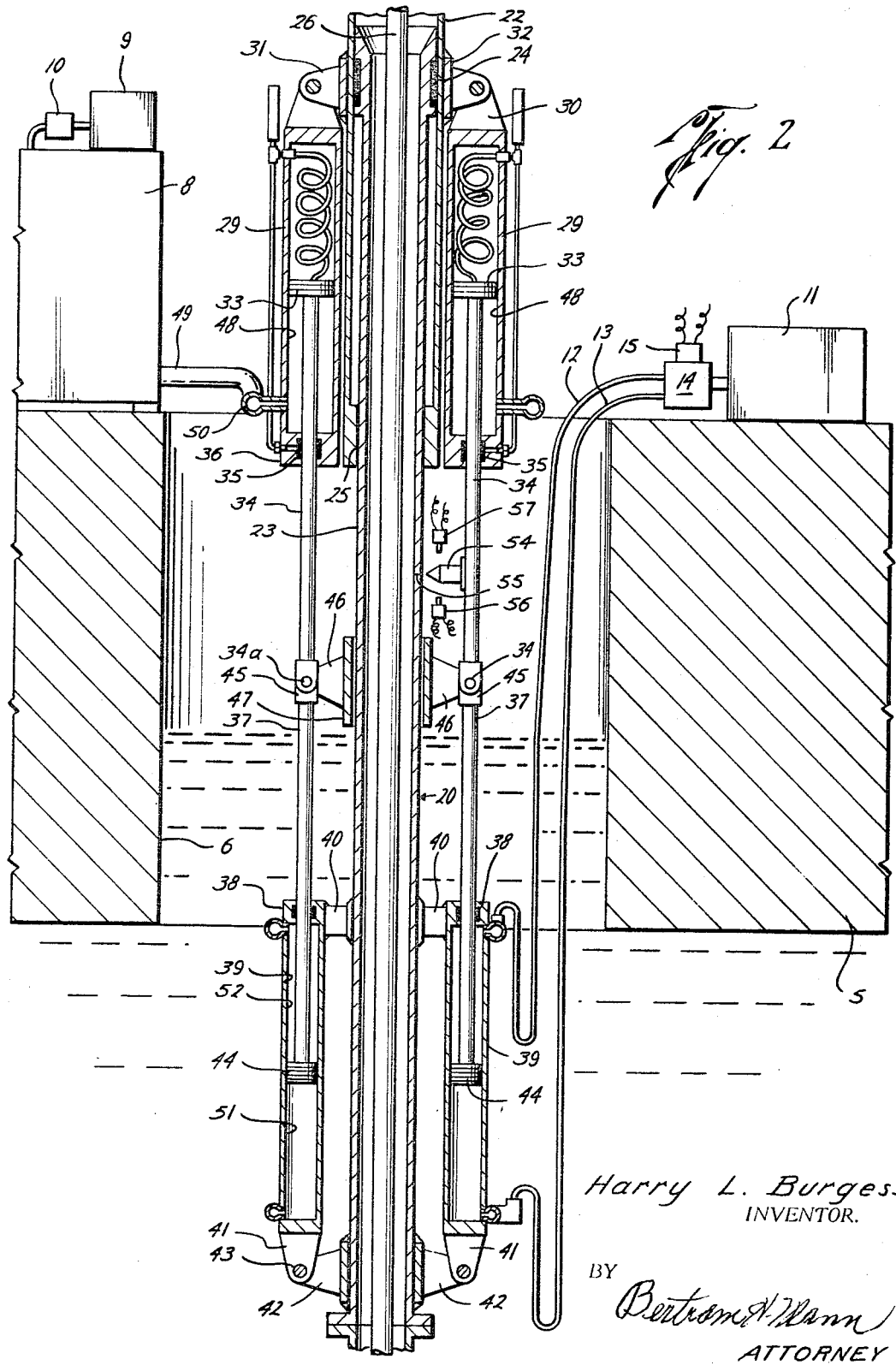
FIG. 2 is a vertical section through the lower part of the vessel and the novel slip joint and compensating means.

FIG. 2 shows on enlarged scale the well portion 6 of the vessel 5 through which conductor 20 extends downwardly from a suitable support on the vessel. The conductor includes an upper pipe section 22 and a lower pipe section 23 telescopingly assembled to form a slip joint and provided with sealing packing gland 24. The outer tube section also has a terminal guide flange 25. The drill pipe 26 supported by the derrick extends through the conductor.

A plurality of pneumatic cylinders 29 are clustered symmetrically about the lower extremity of upper conductor pipe section 22 and secured at their upper ends by means of lugs 30 to similar lugs 31 and a collar 32 secured to the upper conductor pipe. The axes of cylinders 29 are parallel to the conductor and plungers 33 are slidable vertically in the cylinders. Links or rods 34 project downwardly from plungers 33 through suitable packing glands 35 in the bottom walls 36 of the cylinders. Links 34 are connected by means of pins 34a, preferably shear pins as will be explained, to lower links or rods 37 which project through packing glands 38 into a second group of cylinders 39 clustered symmetrically about lower conductor pipe 23 substantially below upper cylinders 29. The lower cylinders are secured to the lower conductor pipe by means of brackets 40 at the tops of the lower cylinders and lugs 41 at the bottoms of the latter cylinders which are connected to lugs 42, rigidly secured to the bottom conductor pipe, by means of pins 43. Plungers 44 at the lower ends of links 37 work in lower cylinders 39. Pinned terminal parts 45 on rods 37 are secured by ribs 46 to a guide sleeve 47 which fits loosely about conductor pipe 23.

Plungers 33 normally are located substantially in the centers of upper cylinders 29 and the chambers 48 beneath the plungers 33 are supplied with charges of substantially constant pressured air or other gas from accumulator tank 8 through a supply pipe 49 and an annular header 50. These pneumatic charges serve to resiliently support bottom conductor pipe 23 from upper conductor pipe 22 and the vessel 5. In the normal position of plungers 33, adequate clearance is provided in cylinders 29 both above and below the plungers to accommodate vertical displacements of the two conductor pipe sections resulting from wave action on the supporting vessel.

However, in case the conductor pipe sections are extended or collapsed due to tide action on the vessel, motor means are provided to maintain plungers 33 properly centered in their cylinders. Such means comprises cylinders 39, driven member plungers 44, and linkages 37 and 34 connected to the upper plungers 33. Chambers 51 and 52 in lower cylinders 39 below and above plungers 44 may be supplied with pressured motivating fluid, such as compressed air, through hose lines 12 and 13 which connect through four-way valve 14 to accumulator tank 11. This accumulator tank will be provided with a suitable source of pressured fluid (not shown). Accordingly, cylinders 39 and plungers 44 constitute motors reacting against lower conductor pipe 23 for adjusting the positioning of upper plungers 33 relative to their cylinders 29.

The mentioned adjustments may be either manual or automatic. Secured to one of the links 34 is an indicating pointer 54 which registers with datum mark 55 provided on lower pipe section 23 when upper plungers 33 are substantially centered in their cylinders 29. If manual operation is preferred, the switch pole contacts terminal 62. An operator upon observing a departure of pointer 54 from mark 55 may manually actuate valve 14 so as to provide desired compensatory movement of motor plungers 44 and support plungers 33. For automatic operation, pointer 54 or a corresponding element movable with upper plungers 33 may be associated with limit switch devices as 56 and 57 which may be utilized to control motor 15 for actuating valve 14, as illustrated in the wiring diagram, FIG. 3. According to this figure, a switch pole 59 is connected by a wire 60 to a source of electrical energy represented by battery 61. A first switch contact 62 is connected by means of a wire 63 to one terminal each of the limit switches 56 and 57. Switch 56 is also connected by wires 64 and 65 to one terminal of a solenoid 66. The other terminal of the solenoid is connected by a wire 67 to power source 61. The other limit switch 57 is connected by wires 68 and 69 to one terminal of a solenoid 70, the other terminal of which is connected by a return wire 71 to power source 61. Thus, actuation of limit switches 56 and 57 by pointer 54 will actuate one or the other of solenoids 66 and 70 to shift four-way valve 14 for operating motors 39 and 44 in the proper direction for returning pointer 54 and support plungers 33 to their centered positions. For manual operation, switch pole 59 may engage either of switch contacts 73 or 74. Contact 73 is connected by wires 75 and 65 to solenoid 66, so as to duplicate the action of limit switch 56, while contact 74 is connected by wires 76 and 69 to solenoid 70 in parallel to limit switch 57.

Preferably, cylinders 29 and 39 will be made sufficiently long to accommodate the maximum wave and tide action expected. By means of the present invention, resilient support plungers 33 will be maintained substantially centered in their cylinders irrespective of tide action so as to be ready to accommodate transitory wave actions in either direction. Header 50, preferably, will connect with cylinders 29 sufficiently above the bottom cylinder walls so that in case of extreme upward movement of the cylinders and upper conductor pipe section 22, plungers 33 will pass beneath the header connections with the cylinders so that pressure fluid will be fed into the tops of the cylinders. If the amount of movement provided within cylinders 29 is insufficient for exceptional conditions, striking of the bottoms of cylinders 29 against plungers 33 will shear pins 34a, thus releasing the upper plungers 33 from motor plungers 44. The transfer of pressure fluid above plungers 33, in such case, will prevent the plungers from being rapidly forced upwardly so as to destructively strike the tops of cylinders 29. Thus, the conductor is subjected to substantially constant upward tensional forces irrespective of tidal and wave action on the vessel.

The invention may be modified in various respects as will occur to those skilled in the art, and the exclusive use of all modifications as come within the scope of the appended claims is contemplated.

I claim:

1. An extensible and contractible conduit for connecting the bottom of a body of water and a vessel floating in the water comprising a pair of telescoping pipe sections, expansible and contractible chamber means movable with the upper of said sections and having movable wall means, fluid motor means movable with the lower of said sections and having a driven member, means interconnecting said wall means and said driven member for causing joint movement thereof, a resilient fluid charge in said chamber means for supporting the lower of said pipe sections from the upper pipe section, means for supplying pressured motive fluid to said motor means, and valve means controlling said fluid supplying means for adjusting the positions of said movable walls in said chambers.

2. In a conductor pipe for connecting a submerged well and a floating vessel subject to wave and/or tide action, upper and lower telescoping pipe sections, a resilient device secured between said sections and having a normal position for resiliently resisting relative displacement of said sections in at least one direction, a motor secured to said resilient device, and means for energizing said motor to maintain said device in said normal position.

3. In a conductor pipe as described in claim 2, means responsive to departure of said resilient device from said normal position to energize said motor so as to return said device to said position.

4. In a conductor pipe for connecting a submerged well and a floating vessel subject to wave and/or tide action, upper and lower telescoped sections forming a slip joint, a resiliently compressible chamber device secured to the upper pipe section, a double-acting fluid motor secured to the lower pipe section, means interconnecting said device and said motor, means for supplying motive fluid to said motor, and valve means controlling said fluid supply means for maintaining said device substantially centered irrespective of elongation or contraction of said conductor pipe.

5. A slip joint for a conductor pipe comprising upper and lower telescoped pipe sections in sealing engagement, pneumatic cylinder means secured to the upper pipe section, plunger means working in said cylinder means, means for maintaining substantially uniformly pressured fluid in said cylinder means beneath said plunger means for resiliently resisting relative displacement of said pipe sections in at least one direction, double-acting fluid motor means secured to the lower pipe section, linkage connecting said motor means and said plunger means, and means for supplying motive fluid to said motor means for shifting said plunger means in its cylinder to maintain said plunger means substantially centered in said cylinder means.

6. A constant tension conductor for connecting a submerged well and a floating vessel subject to wave and/or tide action comprising upper and lower telescoped pipe sections sealingly engaged, means resiliently interconnecting said sections including upper chamber means secured to the upper pipe section and having first plunger means therein, a substantially constantly pressured pneumatic charge in said chamber means, lower fluid chamber means secured to said lower pipe section beneath said upper chamber means, second plunger means working in said second chamber means, linkage connecting said first and second plunger means, and pressured fluid supply means connected to said lower chamber means on opposite sides of said second plunger means for adjusting said latter plunger means so as to maintain said upper plunger means in a substantially centered position to accommodate relative displacements of said pipe section in either direction.

7. A constant tension conductor as described in claim 6 in which substantial clearance is provided above and below said upper plunger means to accommodate upward and downward displacements of the upper pipe section relative to the lower pipe section.

8. A constant tension conductor as described in claim 6 including a frangible element incorporated in said linkage for fracturing in case said first plunger means should strike one end of said first chamber means because of abnormal displacement of said pipe sections.

9. A constant tension conductor as described in claim 8 further including a source of pressurized fluid connected to said upper chamber means sufficiently above the bottom thereof as to divert pressured fluid above said first plunger means in one extreme position thereof for preventing said first plunger means from injuriously striking the opposite end of said upper chamber means in case of fracturing of said frangible element.

10. A constant tension conductor as described in claim 6 in which said upper and lower chamber means each comprises a group of working cylinders with each cylinder of one group paired with a cylinder of the other group and a plunger is provided in each of the upper cylinders linked to the corresponding fluid cylinder of the lower group.

References Cited by the Examiner
UNITED STATES PATENTS

| 3,158,208 | 11/1964 | Kammerer | 175—27 |
| 3,195,639 | 7/1965 | Pollard et al. | 166—.5 |
| 3,211,224 | 10/1965 | Lacy | 166—.5 |

CARL W. TOMLIN, *Primary Examiner.*

D. W. AROLA, *Assistant Examiner.*